US012291040B2

(12) United States Patent
Kuramochi

(10) Patent No.: US 12,291,040 B2
(45) Date of Patent: May 6, 2025

(54) IMAGE FORMATION DEVICE

(71) Applicant: Konica Minolta, Inc., Tokyo (JP)

(72) Inventor: Yusuke Kuramochi, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 220 days.

(21) Appl. No.: 18/012,156

(22) PCT Filed: Jun. 24, 2020

(86) PCT No.: PCT/JP2020/024892
§ 371 (c)(1),
(2) Date: Dec. 21, 2022

(87) PCT Pub. No.: WO2021/260862
PCT Pub. Date: Dec. 30, 2021

(65) Prior Publication Data

US 2023/0256750 A1 Aug. 17, 2023

(51) Int. Cl.
*B41J 2/18* (2006.01)
*B41J 2/175* (2006.01)

(52) U.S. Cl.
CPC ................. *B41J 2/18* (2013.01); *B41J 2/175* (2013.01)

(58) Field of Classification Search
CPC .................................... B41J 2/18; B41J 2/175
See application file for complete search history.

(56) References Cited

U.S. PATENT DOCUMENTS

2008/0158320 A1 7/2008 Nitta et al.
2009/0109267 A1 4/2009 Lee et al.
2010/0177148 A1* 7/2010 Asami ........................ B41J 2/18 347/85

FOREIGN PATENT DOCUMENTS

| | | | |
|---|---|---|---|
| JP | 2008-000962 | A | 1/2008 |
| JP | 2009-285845 | A | 12/2009 |
| JP | 2011-088435 | A | 5/2011 |
| JP | 5292037 | B2 | 9/2013 |

OTHER PUBLICATIONS

Notice of Reasons for Refusal issued in corresponding Japanese Patent Application No. 2022-531333, dated Feb. 6, 2024 (6 pages).
International Search Report issued in corresponding International Application No. PCT/JP2020/024892 mailed Aug. 25, 2020 (5 pages).

(Continued)

*Primary Examiner* — Justin Seo
(74) *Attorney, Agent, or Firm* — Osha Bergman Watanabe & Burton LLP

(57) ABSTRACT

An image forming apparatus includes: an inkjet head; an ink reservoir that stores ink circulating between the inkjet head and the ink reservoir; a pressure generating unit that communicates with the inkjet head and generates a first pressure such that an internal pressure of the ink reservoir becomes the first pressure; and a first fluid resistor that gives resistance to a fluid flowing through a fluid communication path between the ink reservoir and the pressure generating unit such that the internal pressure of the ink reservoir becomes a second pressure.

5 Claims, 4 Drawing Sheets

(56) References Cited

OTHER PUBLICATIONS

Written Opinion issued in corresponding International Application No. PCT/JP2020/024892 mailed Aug. 25, 2020 (3 pages).
Translation of the International Preliminary Report on Patentability in corresponding International Application No. PCT/JP2020/024892 mailed Jan. 5, 2023 (5 pages).
Extended European Search Report issued in corresponding European Patent Application No. EP 20941886.2 dated Jun. 29, 2023 (8 pages).
First Office Action issued in corresponding Chinese Application No. 202080102290.4, mailed Feb. 28, 2025 (11 pages).

* cited by examiner

IMAGE FORMATION DEVICE

TECHNICAL FIELD

The present invention relates to an image forming apparatus.

BACKGROUND ART

Conventionally, an inkjet image forming apparatus (hereinafter, referred to as an image forming apparatus) that forms (records) an image on a recording medium by ejecting ink from a plurality of nozzles provided in an inkjet head to the recording medium conveyed by a conveyance device has been known.

Some image forming apparatuses include an ink supply mechanism that supplies ink to the inkjet head while circulating ink between a supply tank supplying ink, an inkjet head, and a collection tank collecting ink (e.g., see Patent Literature (hereinafter, referred to as "PTL") 1 and PTL 2).

In the above-described ink supply mechanism, the supply tank supplying ink to the inkjet head is disposed above the inkjet head. The supply tank and the inkjet head are connected to each other through an ink supply path.

Negative pressure (negative pressure for meniscus) is applied to the supply tank, and this negative pressure forms an appropriate meniscus pressure at the ejection opening of the inkjet head. An appropriate control of the meniscus pressure can form a meniscus having an appropriate shape in the ejection opening of the inkjet head.

Further, in the above-described ink supply mechanism, the collection tank collecting ink from the inkjet head is disposed above the inkjet head and at a position lower than the supply tank. Negative pressure that is the same as that applied to the supply tank is also applied to this collection tank, and the ink having been supplied to the inkjet head is guided through an ink collection path due to the height difference (water head difference) between the supply tank and the collection tank. The flow rate of ink flowing to the inkjet head is adjusted due to the height difference between the supply tank and the collection tank.

A configuration in which the negative pressure having the same magnitude is applied to the supply tank and the collection tank will be described hereinafter. The supply tank and the collection tank each communicate with a pressure reduction tank (buffer tank) configured to be capable of accommodating a predetermined volume of gas. A vacuum pump is connected to the pressure reduction tank through a vacuum path. Then, the pressure in the pressure reduction tank is reduced to a predetermined pressure by the driving control of the vacuum pump, and the pressure in the supply tank and the collection tank, which communicate with the pressure reduction tank, is also reduced to a predetermined pressure (negative pressure is applied).

Note that the collection tank and the supply tank are connected to each other through a circulation path in which a pump is provided. When a level sensor disposed in the supply tank detects that the ink level in the supply tank has fallen below a predetermined level, the pump is driven, and the ink having being collected in the collection tank is returned to the supply tank through the circulation path.

PATENT LITERATURES

PTL 1

Japanese Patent Application Laid-Open No. 2008-962

PTL 2

Japanese Patent Application Laid-Open No. 2009-285845

However, in the above-described ink supply mechanism, the flow rate of ink flowing to the inkjet head can be increased by an increase of the height difference between the supply tank and the collection tank; however, in order to increase the height difference, the height position of the supply tank and the height position of the collection tank need to be widely separated from each other, which results in an increase in the size of the apparatus.

To downsize the apparatus, a configuration is conceivable in which the height difference between the supply tank and the collection tank is eliminated, the negative pressures of different magnitudes are applied to the supply tank and the collection tank, and the pressure difference (atmospheric pressure difference) between the supply tank and the collection tank guides the ink having been supplied to the inkjet head to the collection tank. However, when a plurality of supply tanks and collection tanks are provided to the plurality of inkjet heads, respectively, it is necessary to prepare the number of negative pressure generating sources (pressure reduction tanks and vacuum pumps) for the number of the plurality of the inkjet heads, consequently, for the number of the plurality of supply tanks and collection tanks, which would increase the apparatus cost.

SUMMARY

One or more of the present invention provide an image forming apparatus capable of optionally adjusting a flow rate of ink flowing through a plurality of inkjet heads without involving an increase in the apparatus cost.

An image forming apparatus according to one or more embodiments of the invention includes: an inkjet head; an ink reservoir that stores ink circulating between the inkjet head and the ink reservoir; a pressure generating unit that communicates with the inkjet head and generates a first pressure so that an internal pressure of the ink reservoir becomes the first pressure; and a first fluid resistor that gives resistance to a fluid flowing through a fluid communication path between the ink reservoir and the pressure generating unit so that the internal pressure of the ink reservoir becomes a second pressure different from the first pressure.

According to one or more embodiments of the present invention, it is possible to optionally adjust a flow rate of ink flowing to a plurality of inkjet heads without increasing a device cost.

DETAILED DESCRIPTION OF EMBODIMENTS

Figure 1:
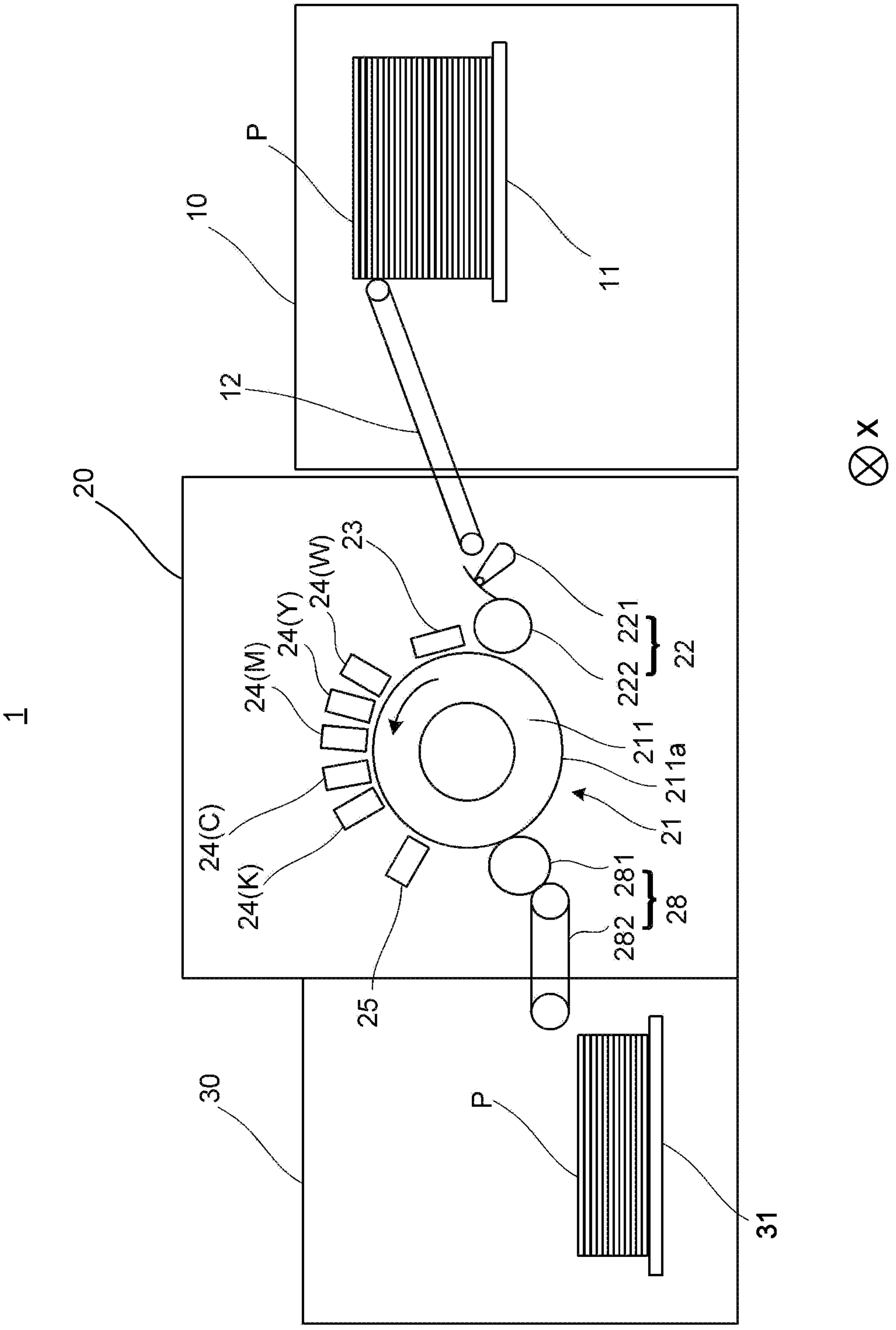
FIG. 1 illustrates an overview configuration of an inkjet image forming apparatus.

FIG. 1 illustrates an overview configuration of inkjet image forming apparatus 1. Inkjet image forming apparatus 1 includes sheet feeding section (or sheet feeder) 10, image forming section (or image forming device) 20, sheet discharging section (or sheet discharger) 30, and control section (or controller) 40 (see FIG. 3).

Inkjet image forming apparatus 1 (functioning as an "image forming apparatus"), under the control of control section 40, conveys recording medium P stored in sheet feeding section 10 to image forming section 20, forms an image on recording medium Pin image forming section 20, and conveys recording medium P on which the image has been formed to sheet discharging section 30. As recording medium P, in addition to a paper such as a plain paper and a coated paper, various media capable of fixing ink landed on the surface, such as a fabric or a sheet-like resin, can be used.

Sheet feeding section 10 includes sheet feeding tray 11 for storing recording medium P, and medium supply section (or medium supplier) 12 for conveying and supplying recording medium P from sheet feeding tray 11 to image forming section 20. Medium supply section 12 includes an annular belt whose inner side is supported by two rollers, and conveys recording medium P from sheet feeding tray 11 to image forming section 20 by rotating the rollers with recoding medium P placed on the belt.

Image forming section 20 includes conveyance section (or conveyor) 21, passing unit (or transfer unit) 22, heating section 23, head unit (or printhead) 24, fixing section (or fixing device) 25, delivery section 28 (or delivery unit), and the like.

Conveyance section 21 performs a conveyance operation that holds recording medium P placed on conveyance surface 211*a* (placing surface) of conveyance drum 211 and conveys recording medium P placed on conveyance drum 211 in the conveyance direction (Y direction) by rotating and moving conveyance drum 211 on a rotation axis (cylindrical axis) extending in X direction (the direction perpendicular to the sheet surface of FIG. 1).

Conveyance drum 211 includes a claw portion (not illustrated) and an intake portion (not illustrated) for holding recording medium P on conveyance surface 211*a*. Recording medium P is held on conveyance surface 211*a* by the claw portion holding the end of recording medium P and the intake portion suctioning recording medium P to conveyance surface 211*a*. Conveyance section 21 is connected to a conveyance drum motor (not illustrated) for rotating conveyance drum 211. Conveyance drum 211 rotates by an angle proportional to the rotation amount of the conveyance drum motor.

Passing unit 22 transfers recording medium P conveyed from medium supply section 12 of sheet feeding section 10 to conveyance section 21. Passing unit 22 is provided between medium supply section 12 of sheet feeding section 10 and conveyance section 21, holds and takes up one end of recording medium P conveyed from medium supply section 12 by swing arm 221, and transfers recording medium P to conveyance section 21 through passing drum 222.

Heating section 23 is provided between the placing position of passing drum 222 and the placing position of head unit 24, and heats recording medium P so that recording medium P conveyed by conveyance section 21 has a temperature within a predetermined temperature range. Heating section 23 includes, for example, an infrared heater or the like, and energizes the infrared heater based on a control signal supplied from control section 40 (see FIG. 3) to generate heat of the infrared heater.

Head unit 24 forms an image by ejecting ink to recording medium P from a nozzle opening provided in an ink ejecting surface facing conveyance surface 211*a* of conveyance drum 211 at an appropriate timing corresponding to the rotation of conveyance drum 211 on which recording medium P is held. Head unit 24 is placed so that the ink ejecting surface and conveyance surface 211*a* are separated from each other by a predetermined distance.

In inkjet image forming apparatus 1 according to the present embodiment, four head units 24 corresponding to four colors of inks: white (W), yellow (Y), magenta (M), cyan (C), and black (K), respectively, are arranged in the order of W, Y, M, C, and K from the upstream side in the conveyance direction of recording medium P at predetermined intervals.

Figure 2:
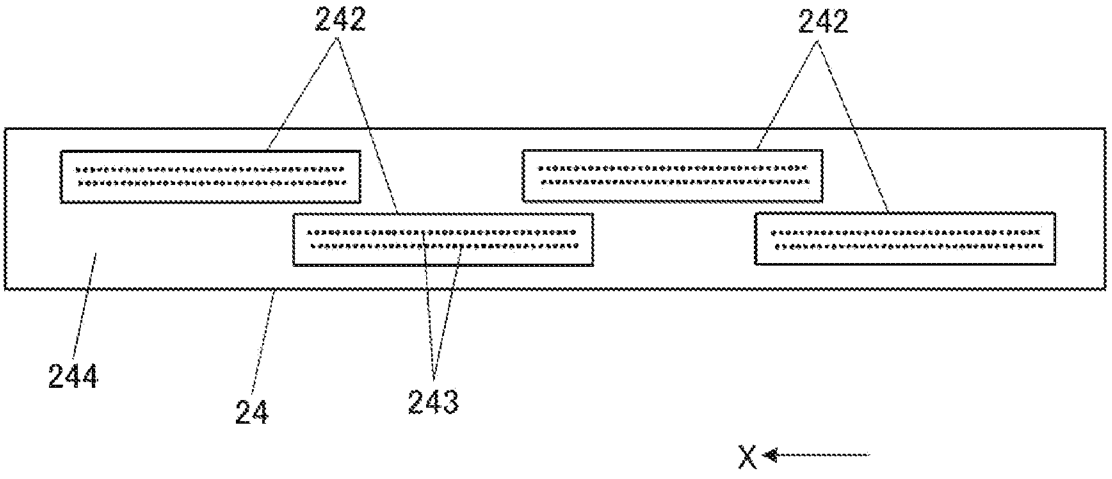
FIG. 2 is a schematic diagram illustrating a configuration of a head unit.

FIG. 2 is a schematic diagram illustrating a configuration of head unit 24. Here, in head unit 24, a surface facing conveyance surface 211*a* of conveyance drum 211 is illustrated.

Head unit 24 includes four inkjet heads 242 attached to attachment member 244. Each of inkjet heads 242 is provided with a plurality of image forming elements (recording elements) each including a pressure chamber for storing ink, a piezoelectric element provided on the wall surface of the pressure chamber, and nozzle 243. When a driving signal to deform the piezoelectric element is input, the deformation of the piezoelectric element deforms the pressure chamber to change the pressure inside the pressure chamber, and thus the image forming element ejects ink from the nozzle communicating with the pressure chamber.

In inkjet head 242, two nozzle arrays are formed by nozzles 243 arranged at equal internals in the direction intersecting the conveyance direction of recording medium P (in the present embodiment, the direction orthogonal to the conveyance direction, that is, X direction). These two nozzle arrays are provided so that the arrangement positions of nozzles 243 are shifted from each other by one-half of the arrangement interval of nozzle 243 in each nozzle array in the X direction.

Four inkjet heads 242 are arranged in a zigzag pattern so that the arrangement ranges of the nozzle arrays in the X direction are connected with each other without any breaks. The arrangement ranges of nozzles 243 included in head unit 24 in the X direction covers the width of the area where an image is formed on recording medium P conveyed by conveyance section 21 in the X direction, and the position of head unit 24 is fixed with respect to the rotation axis of conveyance drum 211 when the image is formed. That is, head unit 24 includes a line head capable of ejecting ink over an image-formable-width in the X direction with respect to recording medium P, and inkjet image forming apparatus 1 is a single-pass inkjet image forming apparatus.

Note that the number of nozzle arrays included in inkjet head 242 may not be two, and may be one, three or more. Further, the number of inkjet heads 242 included in head unit 24 may not be four, and may be three or less, or five or more.

As the ink ejected from nozzle 243 of the image forming element, ink containing a pigment, for example, a white ink containing titanium dioxide or the like as a pigment is used. Further, as the ink ejected from nozzle 243 of the image forming element, gel ink containing a gelling agent and having a property of being phase-changed to a gel state or a sol state depending on the temperature and being cured by the irradiation with an energy ray such as ultraviolet rays is used. In the present embodiment, gel ink is used as the ink ejected from nozzle 243 of the image forming element.

Head unit 24 includes an ink heating section (or ink heater) (not illustrated) that heats the ink stored in head unit 24. The ink heating section operates under the control of control section 40 and heats the ink to the temperature at which the ink is in a sol state.

Inkjet head 242 ejects the ink that has been heated to be in a sol state. When the sol-state ink is ejected to recording medium P, the ink droplet is landed on recording medium P, immediately is in a gel state by natural cooling, and solidifies on recording medium P.

Fixing section 25 includes a light-emitting section (or a light emitter) disposed over the width of conveyance section 21 in the X direction, and irradiates recording medium P placed on conveyance section 21 with the energy rays such as ultraviolet rays from the light-emitting section to cure and fix the ink (gel ink) ejected on recording medium P. The light-emitting section of fixing section 25 is disposed between the placing position of head unit 24 and the placing position of transferring drum 281 of delivery section 28 in the conveyance direction so as to face conveyance surface 211*a*.

Delivery section 28 includes transferring drum 281 having a cylindrical shape and transferring recording medium P from conveyance section 21 to belt loop 282, and belt loop 282 including an annular belt whose inner side is supported by two rollers. Transferring drum 281 transfers recording medium P from conveyance section 21 to the surface of belt loop 282, and belt loop 282 conveys and discharges recording medium P to sheet discharging section 30.

Sheet discharging section 30 includes sheet discharging tray 31 having a plate shape on which recording medium P transferred from image forming section 20 by delivery section 28 is placed.

Figure 3:
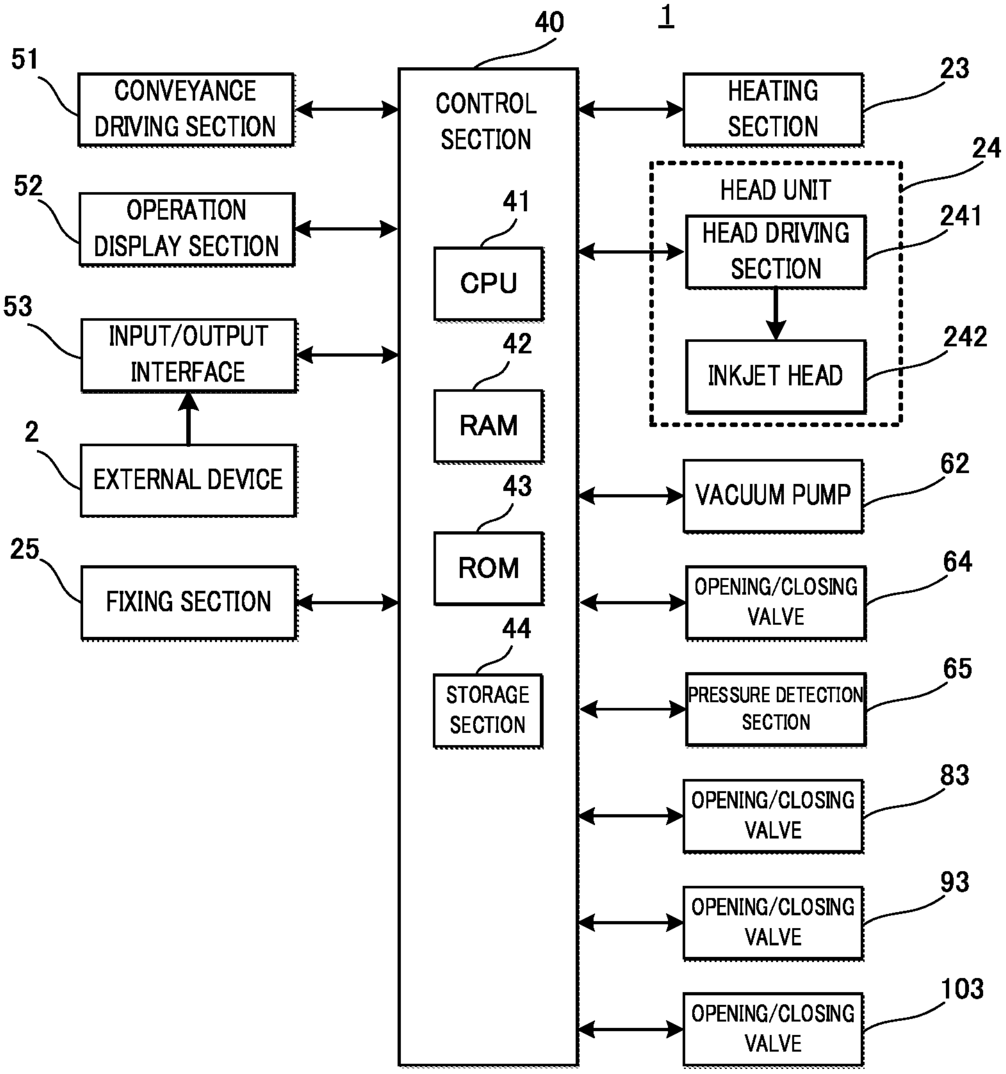
FIG. 3 is a block diagram illustrating a main functional configuration of the inkjet image forming apparatus.

FIG. 3 is a block diagram illustrating a main functional configuration of inkjet image forming apparatus 1. Inkjet image forming apparatus 1 includes heating section 23, head driving section (or head driver) 241 and inkjet head 242, fixing section 25, control section 40, conveyance driving section (conveyance driver) 51, operation display section 52, input/output interface 53, and the like.

Head driving section 241 supplies a driving signal to deform the piezoelectric element to the image forming element of inkjet head 242 at an appropriate timing in accordance with the image data, and causes nozzle 243 of inkjet head 242 to eject ink of the amount corresponding to the pixel value of the image data.

Control section 40 includes Central Processing Unit (CPU) 41, Random Access Memory (RAM) 42, Read Only Memory (ROM) 43, and storage section (or storage) 44.

CPU 41 reads out various control programs and setting data stored in ROM 43, causes RAM 42 to store the programs and the data, and executes the program to perform various arithmetic processes. Further, CPU 41 performs overall control of the entire operation of inkjet image forming apparatus 1.

RAM 42 provides a working memory space to CPU 41 and stores temporary data. RAM 42 may include a non-volatile memory.

ROM 43 stores various control programs executed by CPU 41, and/or setting data or the like. Note that, instead of ROM 43, a rewritable non-volatile memory such as an Electrically Erasable Programmable Read Only Memory (EEPROM) and a flash memory may be used.

Storage section 44 stores a printing job (image forming command) input from external device 2 via input/output interface 53, and image data related to the printing job and/or the like. Among these, the printing job includes, in addition to information specifying image data related to the image to be formed, information related to the type of recording medium P (e.g., the size and thickness of recording medium P) on which the image is formed. As storage section 44, a Hard Disk Drive (HDD) may be used, and a Dynamic Random Access Memory (DRAM) or the like may be used in combination.

Conveyance driving section 51 supplies a driving signal to a conveyance motor of conveyance drum 211 based on a control signal supplied from control section 40, and rotates conveyance drum 211 at a predetermined speed and timing.

Further, conveyance driving section 51 supplies a driving signal to a motor for operating medium supply section 12, passing unit 22, and delivery section 28 based on the control signal supplied from control section 40, and causes medium supply section 12, passing unit 22, and delivery section 28 to supply recording medium P to conveyance section 21 and to discharge recording medium P from conveyance section 21.

Operation display section 52 includes a display device such as a liquid crystal display and an organic EL display, and an input device such as an operation key and a touch panel placed to be superposed on a screen of the display device. Operation display section 52 displays various types of information on the display device, and converts an input operation input to the input device by the user into an operation signal to output the operation signal to control section 40.

Input/output interface 53 mediates transmission and reception of data between external device 2 and control section 40. Input/output interface 53 includes, for example, any of various serial interfaces and various parallel interfaces, or a combination thereof.

External device 2 is, for example, a personal computer, and supplies a printing job, image data, and the like to control section 40 via input/output interface 53.

Next, a configuration of ink supply mechanism 60 that supplies ink to inkjet heads 242 in inkjet image forming apparatus 1 will be described with reference to FIG. 4. Ink supply mechanism 60 supplies ink to the inkjet head while circulating ink between the supply tank supplying ink, the inkjet head, and the collection tank collecting ink.

Figure 4:
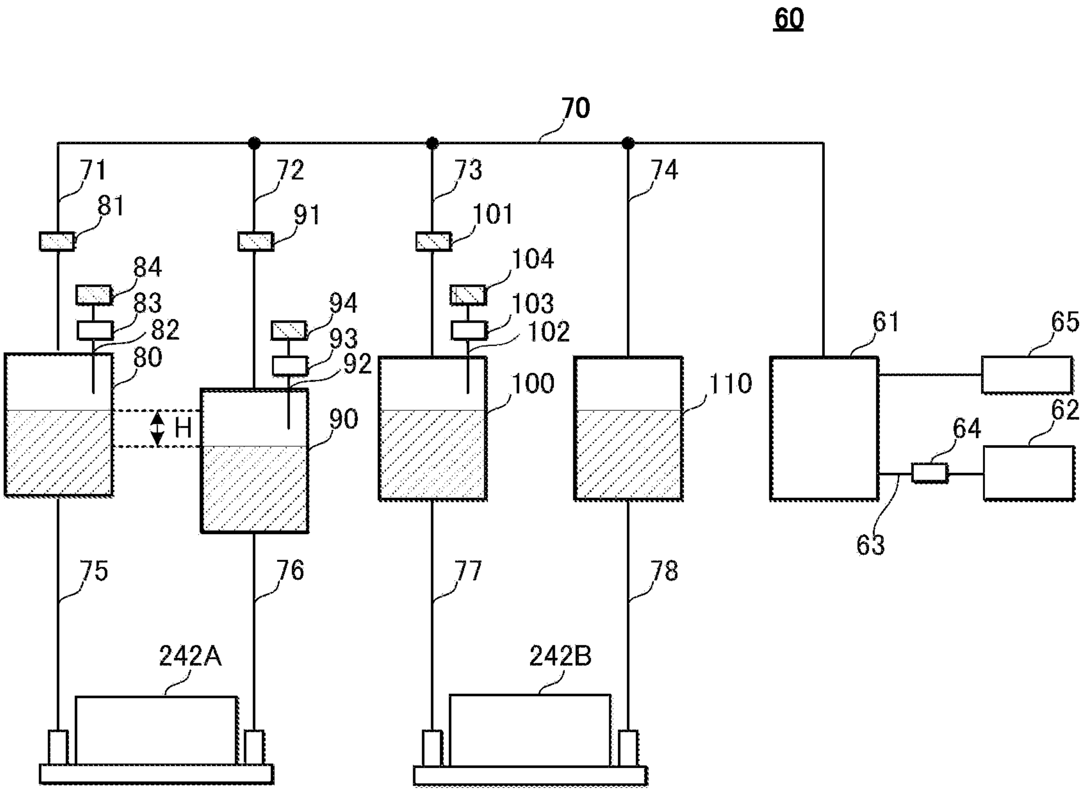
FIG. 4 illustrates a configuration of an ink supply mechanism that supplies ink to an inkjet head.

As illustrated in FIG. 4, ink supply mechanism 60 includes pressure reduction tank 61, vacuum pump 62, opening/closing valve 64, pressure detection section (or pressure detector) 65, first supply tank 80, opening/closing valve 83, first collection tank 90, opening/closing valve 93, second supply tank 100, opening/closing valve 103, second collection tank 110, and the like.

Note that first supply tank 80, first collection tank 90, second supply tank 100, and second collection tank 110 function as an "ink reservoir" that stores ink communicating between the inkjet head and the ink reservoir. Further, opening/closing valves 83, 93, and 103 function as an "opening/closing section".

First supply tank 80 stores ink supplied to inkjet head 242A (functioning as a "first inkjet head") through ink supply path 75. In the present embodiment, first supply tank 80 is disposed above inkjet head 242A.

Although not illustrated, first supply tank 80, first collection tank 90, and inkjet head 242A are provided corresponding to each of four colors of ink: yellow (Y), magenta (M), cyan (C), and black (K). Then, inkjet head 242A ejects ink of the yellow (Y), magenta (M), cyan (C), or black (K) supplied from first supply tank 80.

Negative pressure (negative pressure for meniscus) of, for example, −2.5 kPA is applied to first supply tank 80, and this negative pressure forms an appropriate meniscus pressure to the ejection opening of inkjet head 242A. An appropriate control of a meniscus having an appropriate shape at the ejection opening of inkjet head 242A.

Atmosphere communication path 82 (an atmosphere releasing pipe) communicable with the atmosphere is connected to first supply tank 80. Opening/closing valve 83 (e.g., a solenoid valve) opens and closes atmosphere communication path 82 upon reception of the control of control section 40, and adjusts the amount of air in the atmosphere suctioned into first supply tank 80 through atmosphere communication path 82 to adjust (increase) the pressure inside first supply tank 80 toward the atmospheric pressure.

First collection tank 90 stores the ink collected from inkjet head 242A through ink collection path 76. In the present embodiment, a metal container having a capacity of about 40 liters is used as first collection tank 90. In the present embodiment, first collection tank 90 is disposed above inkjet head 242A and at the position lower than first supply tank 80.

Negative pressure having the same magnitude (e.g., −2.5 kPa) as that applied to first supply tank 80 is applied to first collection tank 90, and the ink that has been supplied from first supply tank 80 to inkjet head 242A is guided to first collection tank 90 through ink collection path 76 due to the height difference (water head difference indicated by H in FIG. 4) between first supply tank 80 and first collection tank 90. The flow rate of ink flowing to inkjet head 242A is adjusted due to the height difference between first supply tank 80 and first collection tank 90.

Atmosphere communication path 92 (an atmosphere releasing pipe) communicable with the atmosphere is connected to first collection tank 90. Opening/closing valve 93 (e.g., a solenoid valve) opens and closes atmosphere communication path 92 upon reception of the control of control section 40, and adjusts the amount of air in the atmosphere suctioned into first collection tank 90 through atmosphere communication path 92 to adjust (increase) the pressure in first collection tank 90 toward the atmospheric pressure.

Note that first supply tank 80 and first collection tank 90 are connected to each other through a circulation path (not illustrated) in which a pump is provided. When the level sensor disposed in first supply tank 80 detects that the ink level in first supply tank 80 has fallen below the predetermined level, the pump is driven, and the ink collected in first collection tank 90 is returned to first supply tank 80 through the circulation path.

Second supply tank 100 stores the ink supplied to inkjet head 242B (functioning as a "second inkjet head") through ink supply path 77. In the present embodiment, second supply tank 100 is disposed above inkjet head 242B. Inkjet head 242B ejects white (W) ink supplied from second supply tank 100.

Negative pressure (negative pressure for meniscus) of, for example, −2.5 kPA is applied to second supply tank 100, and this negative pressure forms an appropriate meniscus pressure to the ejection opening of inkjet head 242B. An appropriate control of meniscus pressure can form a meniscus having an appropriate shape at the ejection opening of inkjet head 242B.

Atmosphere communication path 102 (an atmosphere releasing pipe) communicable with the atmosphere is connected to second supply tank 100. Opening/closing valve 103 (e.g., a solenoid valve) opens and closes atmosphere communication path 102 upon reception of the control of control section 40, and adjusts the amount of air in the atmosphere suctioned into second supply tank 100 through atmosphere communication path 102 to adjust (increase) the pressure inside second supply tank 100 toward the atmospheric pressure.

Second collection tank 110 stores the ink collected from inkjet head 242B through ink collection path 78. In the present embodiment, a metal container having a capacity of about 40 liters is used as second collection tank 110. In the present embodiment, second collection tank 110 is disposed above inkjet head 242B and at the same height as second supply tank 100.

Negative pressure different from that applied to second supply tank 100 (e.g., −14.5 kPA) is applied to second collection tank 110, and a difference between the negative pressures applied respectively to second supply tank 100 and second collection tank 110 guides the ink that has been supplied from second supply tank 100 to inkjet head 242B to second collection tank 110 through ink collection path 78. The flow rate of ink flowing to inkjet head 242B is adjusted by the difference between the negative pressures applied respectively to second supply tank 100 and second collection tank 110.

Note that second supply tank 100 and second collection tank 110 are connected to each other through a circulation path (not illustrated) in which a pump is provided. When the level sensor disposed in second supply tank 100 detects that the ink level in second supply tank 100 has fallen below the predetermined level, the pump is driven, and the ink collected in second collection tank 110 is returned to second supply tank 100 through the circulation path.

Next, a specific configuration of applying the negative pressures to first supply tank 80, first collection tank 90, second supply tank 100, and second collection tank 110 will be described.

First supply tank 80 communicates with pressure reduction tank 61 (buffer tank) through fluid communication paths 70 and 71. Further, first collection tank 90 communicates with pressure reduction tank 61 through fluid communication paths 70 and 72. Furthermore, second supply tank 100 communicates with pressure reduction tank 61 through fluid communication paths 70 and 73, and second collection tank 110 communicates with pressure reduction tank 61 through fluid communication paths 70 and 74.

Pressure reduction tank 61 is configured to be capable of accommodating a predetermined volume of gas. Vacuum pump 62 is connected to pressure reduction tank 61 through vacuum path 63. Upon reception of the control of control section 40, vacuum pump 62 suctions the air in pressure reduction tank 61 through vacuum path 63 to reduce the pressure (atmospheric pressure) in pressure reduction tank 61. Pressure detection section 65 detects the pressure in pressure reduction tank 61 and outputs the detection data to control section 40. Under the control of control section 40, opening/closing valve 64 (e.g., a solenoid valve) opens and closes vacuum path 63 to adjust the amount of air suctioned into vacuum pump 62 in accordance with the detection result of pressure detection section 65 so that the pressure in pressure reduction tank 61 becomes a predetermined pressure (e.g., −14.5 kPa).

Control section 40 controls vacuum pump 62 and opening/closing valve 64 to reduce the pressure in pressure reduction tank 61 to a predetermined pressure (corresponding to a "first pressure"), thereby controls the pressures in first supply tank 80, first collection tank 90, second supply tank 100, and second collection tank 110 each communicating with pressure reduction tank 61 to reduce the pressures to the predetermined pressure (negative pressure application). Note that control section 40, pressure reduction tank 61, vacuum pump 62, opening/closing valve 64, and pressure detection section 65 function as a "pressure generating unit" generating the first pressure so that the internal pressures of first supply tank 80, first collection tank 90, second supply tank 100, and second collection tank 110 become the first pressure.

Incidentally, in the conventional ink supply mechanism, increasing the flow rate of ink flowing to the inkjet head can be achieved by an increase of the height difference (water head difference) between the supply tank and the collection tank. However, the height of the supply tank and the height of the collection tank need to be widely separated from each other to increase the height difference, which results in an increase in the size of the apparatus.

To downsize the apparatus, a configuration is conceivable in which the height difference between the supply tank and the collection tank is eliminated and the negative pressure of different levels is applied to the supply tank and the collection tank, and the pressure difference (atmospheric pressure difference) between the supply tank and the collection tank guides the ink having been supplied to the inkjet head to the collection tank. However, when a plurality of supply tanks and collection tanks are provided to each of a plurality of inkjet heads, it is necessary to prepare negative pressure generating sources (pressure reduction tanks and vacuum pumps) for the number of the plurality of inkjet heads, consequently, for the number of the plurality of the supply tanks and the collection tanks, which would increase the device cost.

Therefore, in the present embodiment, ink supply mechanism 60 adopts a configuration in which the flow rate of ink flowing to a plurality of inkjet heads can be optionally adjusted without increasing the device cost.

That is, in fluid communication path 71, first fluid resistor 81 is provided to give resistance, that is, to generate a pressure loss, to a fluid (e.g., air) flowing through fluid communication path 71 so that the internal pressure of first supply tank 80 becomes a predetermined pressure (e.g., −2.5 kPa, corresponding to a "second pressure") different from the pressure (e.g., −14.5 kPa) in pressure reduction tank 61. More specifically, when first supply tank 80 is open to the atmosphere, first fluid resistor 81 gives resistance to the fluid flowing through fluid communication path 71 so that the difference between the pressure in pressure reduction tank 61 and the internal pressure of first supply tank 80 is equal to or higher than a predetermined pressure (e.g., 1 kPa).

In the present embodiment, first fluid resistor 81 is an element that reduces the pressure fluctuation in first supply tank 80 against the pressure fluctuation in pressure reduction tank 61 caused by the control of vacuum pump 62 and opening/closing valve 64, and is configured with, for example, an orifice. The fluid resistance value of first fluid resistor 81 can be optionally adjusted by the adjustment of the aperture diameter of the orifice. That is, in the case where first fluid resistor 81 is not provided, the same pressure fluctuation as in pressure reduction tank 61 is caused in first supply tank 80 with time after the pressure fluctuation in pressure reduction tank 61 starts; however, providing first fluid resistor 81 allows the adjustment of the internal pressure of first supply tank 80 to a predetermined pressure (e.g., −2.5 kPa).

Note that, when it is difficult to adjust the internal pressure of first supply tank 80 to a predetermined pressure only by first fluid resistor 81 (e.g., when the pressure value in pressure reduction tank 61, consequently, the negative pressure value applied to first supply tank 80, is very large), control section 40 may control opening/closing valve 83 and adjust the amount of air in the atmosphere suctioned into first supply tank 80 through atmosphere communication path 82 to adjust the pressure in first supply tank 80.

Further, in fluid communication path 72, first fluid resistor 91 is provided to give resistance, that is, to generate a pressure loss, to a fluid (e.g., air) flowing through fluid communication path 72 so that the internal pressure of first collection tank 90 becomes a predetermined pressure (e.g., −2.5 kPa, corresponding to a "second pressure") different from the pressure (e.g., −14.5 kPa) in pressure reduction tank 61. More specifically, when first collection tank 90 is open to the atmosphere, first fluid resistor 91 gives resistance to a fluid flowing through fluid communication path 72 so that the difference between the pressure in pressure reduction tank 61 and the internal pressure of first collection tank 90 is equal to or higher than a predetermined pressure (e.g., 1 kPa).

In the present embodiment, first fluid resistor 91 is an element that reduces the pressure fluctuation in first collection tank 90 against the pressure fluctuation in pressure reduction tank 61 caused by the control of vacuum pump 62 and opening/closing valve 64, and is configured with, for example, an orifice. The fluid resistance value of first fluid resistor 91 can be optionally adjusted by the adjustment of the aperture diameter of the orifice. That is, in the case where first fluid resistor 91 is not provided, the same pressure fluctuation as in pressure reduction tank 61 is caused in first collection tank 90 with time after the pressure fluctuation in pressure reduction tank 61 starts; however, providing first fluid resistor 91 allows the adjustment of the internal pressure of first collection tank 90 to a predetermined pressure (e.g., −2.5 kPa).

Note that, when it is difficult to adjust the internal pressure of first collection tank 90 to a predetermined pressure only by first fluid resistor 91 (e.g., when the pressure value in pressure reduction tank 61, consequently, the negative pressure value applied to first supply tank 90, is very large), control section 40 may control opening/closing valve 93 and may adjust the amount of air in the atmosphere suctioned into first collection tank 90 through atmosphere communication path 92 to adjust the pressure in first collection tank 90.

Further, in fluid communication path 73, first fluid resistor 101 is provided to give resistance, that is, to generate a pressure loss, to a fluid (e.g., air) flowing through fluid communication path 73 so that the internal pressure of second supply tank 100 is a predetermined pressure (e.g., −2.5 kPa, corresponding to a "second pressure") different from the pressure (e.g., −14.5 kPa) in pressure reduction tank 61. More specifically, when second supply tank 100 is open to the atmosphere, first fluid resistor 101 gives resistance to a fluid flowing through fluid communication path 73 so that the difference between the pressure in pressure reduction tank 61 and the internal pressure of second supply tank 100 is equal to or higher than a predetermined pressure (e.g., 1 kPa).

In the present embodiment, first fluid resistor 101 is an element that reduces the pressure fluctuation in second supply tank 100 against the pressure fluctuation in pressure reduction tank 61 caused by the control of vacuum pump 62 and opening/closing valve 64, and is configured with, for example, an orifice. The fluid resistance value of first fluid resistor 101 can be optionally adjusted by the adjustment of the aperture diameter of the orifice. That is, in the case where that first fluid resistor 101 is not provided, the same pressure fluctuation as in pressure reduction tank 61 is caused in second supply tank 100 with time after the pressure fluctuation in pressure reduction tank 61 starts; however, providing first fluid resistor 101 allows the adjustment of the internal pressure of second supply tank 100 to a predetermined pressure (e.g., −2.5 kPa).

Note that, when it is difficult to adjust the internal pressure of second supply tank 100 to a predetermined pressure only by first fluid resistor 101 (e.g., when the pressure value in pressure reduction tank 61, consequently, the negative pressure value applied to second supply tank 100, is very large), control section 40 may control opening/closing valve 103 and may adjust the amount of air in the atmosphere suctioned into second supply tank 100 through atmosphere communication path 102 to adjust the pressure in second supply tank 100.

Note that fluid communication path 74 does not include the first fluid resistor that gives resistance, that is, generates a pressure loss, to a fluid (e.g., air) flowing through fluid communication path 74; therefore, the internal pressure of second collection tank 110 becomes the same pressure as the pressure (e.g., −14.5 kPa) in pressure reduction tank 61 accordingly with time after the pressure fluctuation in pressure reduction tank 61 is started.

Further, in atmosphere communication path 82, second fluid resistor 84 is provided to give resistance, that is, to generate a pressure loss, to a fluid (e.g., air) flowing through atmosphere communication path 82 so that the internal pressure of first supply tank 80 becomes a predetermined pressure (e.g., −2.5 kPa) different from the pressure (e.g., −14.5 kPa) in pressure reduction tank 61.

Thus, when the amount of air in the atmosphere suctioned into first supply tank 80 through atmosphere communication path 82 is adjusted by the opening and closing of opening/closing valve 83, the pressure fluctuation caused by the adjustment in first supply tank 80 can be easily reduced, and thus the pressure in first supply tank 80 can be easily adjusted. When opening/closing valve 83 is not provided and it is difficult to adjust the internal pressure of first supply tank 80 to a predetermined pressure only by first fluid resistor 81 (e.g., when the pressure value in pressure reduction tank 61, consequently, the negative pressure value applied to first supply tank 80, is very large), providing second fluid resistor 84 allows the adjustment of the amount of air in the atmosphere suctioned into first supply tank 80 through atmosphere communication path 82 and the adjustment of the pressure in first supply tank 80 to a predetermined pressure.

Further, in atmosphere communication path 92, second fluid resistor 94 is provided to give resistance, that is, to generate a pressure loss, to a fluid (e.g., air) flowing through atmosphere communication path 92 so that the internal pressure of first collection tank 90 becomes a predetermined pressure (e.g., −2.5 kPa) different from the pressure (e.g., −14.5 kPa) in pressure reduction tank 61.

Thus, when the amount of air in the atmosphere suctioned into first collection tank 90 through atmosphere communication path 92 is adjusted by the opening and closing of opening/closing valve 93, the pressure fluctuation caused by the adjustment in first collection tank 90 can be easily reduced, and thus the pressure in first collection tank 90 can be easily adjusted. When opening/closing valve 93 is not provided and it is difficult to adjust the internal pressure of first collection tank 90 to a predetermined pressure only by first fluid resistor 91 (e.g., when the pressure value in pressure reduction tank 61, consequently, the negative pressure value applied to first collection tank 90, is very large), providing second fluid resistor 94 allows the adjustment of the amount of air in the atmosphere suctioned into first collection tank 90 through atmosphere communication path 92 and the adjustment of the pressure in first collection tank 90 to a predetermined pressure.

Further, in atmosphere communication path 102, second fluid resistor 84 is provided to give resistance, that is, to generate a pressure loss, to a fluid (e.g., air) flowing through atmosphere communication path 102 so that the internal pressure of second supply tank 100 becomes a predetermined pressure (e.g., −2.5 kPa) different from the pressure (e.g., −14.5 kPa) in pressure reduction tank 61.

Thus, when the amount of air in the atmosphere suctioned into second supply tank 100 through atmosphere communication path 102 is adjusted by the opening and closing of opening/closing valve 103, the pressure fluctuation caused by the adjustment in second supply tank 100 can be easily reduced, and thus the pressure in second supply tank 100 can be easily adjusted. When opening/closing valve 103 is not provided and it is difficult to adjust the internal pressure of second supply tank 100 to a predetermined pressure only by first fluid resistor 101 (e.g., when the pressure value in pressure reduction tank 61, consequently, the negative pressure value applied to second supply tank 100, is very large), providing second fluid resistor 104 allows the adjustment of the amount of air in the atmosphere suctioned into second supply tank 100 through atmosphere communication path 102 and the adjustment of the pressure in second supply tank 100 to a predetermined pressure.

As described in detail above, inkjet image forming apparatus 1 (image forming apparatus) includes: inkjet heads 242A and 242B; first supply tank 80, first collection tank 90, second supply tank 100, and second supply tank 110 (ink reservoir) that each store ink supplied and collected (communicated) between inkjet head 242A and the ink reservoir and between inkjet head 242B and the ink reservoir; a pressure generating unit (control section 40, pressure reduction tank 61, vacuum pump 62, opening/closing valve 64, and pressure detection section 65) that communicates with the inkjet head and generates a first pressure so that an internal pressure of the ink reservoir becomes the first pressure; and first fluid resistors 81, 91 and 101 that each give resistance to a fluid flowing through a fluid communication path between the ink reservoir and the pressure generating unit so that the internal pressure of the ink reservoir becomes a second pressure different from the first pressure.

According to the present embodiment configured as described above, providing first fluid resistors 81, 91, and 101 and adjusting the resistance value of the fluid allows free adjustment of each internal pressure of first supply tank 80, first collection tank 90, and second supply tank 100 to a predetermined pressure different from the pressure generated from one negative pressure generating source (the pressure in pressure reduction tank 61). Therefore, when a plurality of supply tanks (first supply tank 80 and second supply tank 100) and a plurality of collection tanks (first collection tank 90 and second collection tank 110) are provided respectively to the plurality of inkjet heads (inkjet heads 242A and 242B), it is not necessary to prepare negative pressure generating sources (pressure reduction tank and vacuum pump) for the number of the plurality of inkjet heads. Thus, the flow rate of ink flowing to each of the plurality of inkjet heads can be optionally adjusted without involving any increase in the apparatus cost.

Note that, in the present embodiment, an exemplary configuration of ink supply mechanism 60 has been described in which the internal pressure difference (0 kPa=−2.5−(−2.5)) between first supply tank 80 and first collection tank 90 is different from the internal pressure difference (12 kPa=−2.5−(−14.5)) between second supply tank 100 and second collection tank 110, that is, a plurality of inkjet heads 242A and 242B are driven under a plurality of types of pressure difference conditions between the supply tanks and the collection tanks, but the present invention is not limited thereto. For example, ink supply mechanism 60 may adopt a configuration in which the internal pressure difference between first supply tank 80 and first collection tank 90 is the same as the internal pressure difference between second supply tank 100 and second collection tank 110, that is, the plurality of inkjet heads 242A and 242B are driven under one type of pressure difference condition between the supply tanks and the collection tanks.

Further, in the above-described embodiment, an example has been described in which a first fluid resistor is provided to ink supply mechanism 60 that supplies ink to the inkjet head while circulating ink between a supply tank supplying ink, an inkjet head, and a collection tank collecting ink, but the present invention is not limited thereto. For example, a first fluid resistor may be provided to an ink supplying mechanism that supplies ink from the supply tank to the inkjet head without circulating ink between the supply tank, inkjet head, and the collection tank, in order to optionally adjust the internal pressure of the supply tank to a predetermined pressure different from the pressure of the one negative pressure generating source.

In addition, in the above-described embodiment, single-pass inkjet image forming apparatus 1 has been described as an example, but the present invention may be applied to an inkjet image forming apparatus that performs image recording while scanning with a head unit. The present invention may also be applied to an inkjet image forming apparatus in which a single nozzle is provided in a head unit.

Although the disclosure has been described with respect to only a limited number of embodiments, those skill in the art, having benefit of this disclosure, will appreciate that various other embodiments may be devised without departing from the scope of the present invention. Accordingly, the scope of the invention should be limited only by the attached claims.

REFERENCE SIGNS LIST

1 Inkjet image forming apparatus
2 External device
10 Sheet feeding section
11 Sheet feeding tray
12 Medium supply section
20 Image forming section
21 Conveyance section
211 Conveyance drum
211*a* Conveyance surface
22 Passing unit
23 Heating section
24 Head unit
241 Head driving section
242,242A, 242B Inkjet head
243 Nozzle
244 Attachment member
25 Fixing section
28 Delivery section
30 Sheet discharging section
31 Sheet discharging tray
40 Control section
41 CPU
42 RAM
43 ROM
44 Storage section
51 Conveyance driving section
52 Operation display section
53 Input/output interface
60 Ink supply mechanism
61 Pressure reduction tank
62 Vacuum pump
63 Vacuum path
64, 83, 93, 103 Opening/closing valve
65 Pressure detection section
70, 71, 72, 73, 74 Fluid communication path
75, 77 Ink supply path
76, 78 Ink collection path
80 First supply tank
81, 91, 101 First fluid resistor
82, 92, 102 Atmosphere communication path
84, 94, 104 Second fluid resistor
90 First collection tank
100 Second supply tank
110 Second collection tank
L Ink
P Recording medium

The invention claimed is:

1. An image forming apparatus comprising:
an inkjet head;
an ink reservoir that stores ink circulating between the inkjet head and the ink reservoir;
a pressure generating unit that communicates with the inkjet head and generates a first pressure such that an internal pressure of the ink reservoir becomes the first pressure;
a first fluid resistor that gives resistance to a fluid flowing through a fluid communication path between the ink reservoir and the pressure generating unit such that the internal pressure of the ink reservoir becomes a second pressure;
an atmosphere communication path that is connected to the ink reservoir and is communicable with an atmosphere; and
a valve that opens and closes the atmosphere communication path.

2. An image forming apparatus comprising:
an inkjet head;
an ink reservoir that stores ink circulating between the inkjet head and the ink reservoir;
a pressure generating unit that communicates with the inkjet head and generates a first pressure such that an internal pressure of the ink reservoir becomes the first pressure;
a first fluid resistor that gives resistance to a fluid flowing through a fluid communication path between the ink reservoir and the pressure generating unit such that the internal pressure of the ink reservoir becomes a second pressure;
an atmosphere communication path that is connected to the ink reservoir and is communicable with an atmosphere; and
a second fluid resistor that gives resistance to a fluid flowing through the atmosphere communication path.

3. An image forming apparatus comprising:
an inkjet head;
an ink reservoir that stores ink circulating between the inkjet head and the ink reservoir;
a pressure generating unit that communicates with the inkjet head and generates a first pressure such that an internal pressure of the ink reservoir becomes the first pressure; and a first fluid resistor that gives resistance to a fluid flowing through a fluid communication path between the ink reservoir and the pressure generating unit such that the internal pressure of the ink reservoir becomes a second pressure, wherein the first fluid resistor gives resistance to the fluid flowing through the fluid communication path such that a difference between the first pressure and the internal pressure of the ink reservoir is equal to or higher than a predetermined pressure while the ink reservoir is open to an atmosphere.

4. The image forming apparatus according to claim 1, wherein the inkjet head includes a first inkjet head and a second inkjet head, and the ink reservoir comprises:

a first supply tank that stores ink supplied to the first inkjet head;

a first collection tank that stores ink collected from the first inkjet head;

a second supply tank that stores ink supplied to the second inkjet head; and a second collection tank that stores ink collected from the second inkjet head, and wherein an internal pressure difference between the first supply tank and the first collection tank is same as an internal pressure difference between the second supply tank and the second collection tank.

5. The image forming apparatus according to claim 1, wherein the inkjet head includes a first inkjet head and a second inkjet head, and the ink reservoir comprises:

a first supply tank that stores ink supplied to the first inkjet head;

a first collection tank that stores ink collected from the first inkjet head;

a second supply tank that stores ink supplied to the second inkjet head; and a second collection tank that stores ink collected from the second inkjet head, and wherein an internal pressure difference between the first supply tank and the first collection tank is different from an internal pressure difference between the second supply tank and the second collection tank.

* * * * *